United States Patent [19]
Saliga

[11] 3,870,828
[45] Mar. 11, 1975

[54] SUPERIMPOSED BINARY SIGNAL

[75] Inventor: Thomas V. Saliga, Clearwater, Fla.

[73] Assignee: Paradyne Corporation, Largo, Fla.

[22] Filed: Sept. 6, 1973

[21] Appl. No.: 394,766

[52] U.S. Cl..... 179/15 BY, 179/15 BV, 179/15 AN
[51] Int. Cl................................................... H04j 3/12
[58] Field of Search...... 179/15 BA, 15 BV, 15 BY, 179/15 AP, 15 AN

[56] References Cited

UNITED STATES PATENTS

| | | | |
|---|---|---|---|
| 3,433,899 | 3/1969 | Pfleiderer | 179/15 AN |
| 3,660,608 | 2/1972 | Moose | 179/15 AN |
| 3,749,839 | 7/1973 | Fornasiero | 179/15 BV |
| 3,790,715 | 2/1974 | Inose | 179/15 BV |
| 3,794,768 | 2/1974 | Carney | 179/15 BV |

*Primary Examiner*—Ralph D. Blakeslee
*Attorney, Agent, or Firm*—Stein and Orman

[57] ABSTRACT

Superimposed channel signalling device to transmit control functions by superimposing supervisory or secondary channel signals with high speed primary channel signals comprising signal superimposing means to overlay supervisory channel signals on high speed primary channel signals for transmission as a combined or summed signal from local data terminal equipment to a remote system and signal separator means to separate superimposed supervisory channel signals from high speed primary channel signals at the remote receiving data terminal equipment.

14 Claims, 4 Drawing Figures

SUPERIMPOSED BINARY SIGNAL

BACKGROUND OF THE INVENTION

1. Field of the Invention

Superimposed channel signalling device for superimposing supervisory channel signals with high speed primary channel signals for transmission as a combined signal from local to remote data terminal equipment.

2. Description of the Prior Art

Existing data communications systems which transfer information between distant sites normally use voice-grade or special dedicated telephone lines as the transmission medium between the sites. Due to inherent phone-line attenuation and delay distortion system performance specifications dictate that primary channel data be transmitted within a bandwidth of 400 to 2900 hertz. Signalling outside these limits generally degrades system performance below acceptable operating limits. To achieve a throughput signalling rate of 4800 bits per second two level signalling or 9600 bits per second four level signalling requires use of nearly the entire usable bandwidth. Thus, the addition of secondary or supervisory channel signals presents engineering design problems.

Conventional methods for achieving supervisory channel signalling coincident with high speed primary channel signalling is generally accomplished by time-division multiplexing or frequency-division multiplexing the primary and supervisory channel signals. Unfortunately, each of the techniques exhibits significant performance disadvantages.

Using frequency-division multiplexing to send a simultaneous supervisory channel signal at the rate of 150 to 600 bps would require more bandwidth than is in fact available. Furthermore, these supervisory channel signals are often transmitted aperiodically, than is substantially less the 100 per cent of the time. Hence, it would be inefficient to pay a continuing bandwidth price.

The second and more common approach to conventional supervisory channel signalling is time-division multiplexing. To maintain design throughout performance, the high speed data signalling bit rate would be increased from, for example, 9600 bps to 9900 bps. This would require a small percentage increase in bandwidth requirements. For example, if transmitting a 9600 bps; four level PAM signalling, requires a Nyquist bandwidth of 2400 hertz. To achieve the additional 600 bps would require another 75 hertz of bandwidth. This additional 75 hertz of bandwidth is barely within phone channel system usable bandwidth. In addition, the system would have to take fixed performance degradation 100 per cent of the time since once the system is designed to achieve the 2475 hertz bandwith or 9900 bps signalling the necessary additional signalling buffering to multiplex supervisory signals with the primary data stream and then debuffered and demultiplex are added. This complicated buffering has of course its attendant costs.

Thus, a need exists for a supervisory signalling system that requires no additional bandwidth with only minor decreases in overall primary channel performance when in use, and one which can be disabled when not in use with no attendant primary system degradation whatsoever.

SUMMARY OF THE INVENTION

This invention relates to an superimposed channel signalling device for superimposing supervisory or secondary channel signals with primary channel signals for simultaneous transmission. More specifically, this device comprises transmitter means including signal superimposing means to combine the primary and supervisory or secondary signals for transmission and receiver means including signal separator means to separate the combined superimposed signal at the receiving site.

The transmitter means includes a secondary channel pulse amplitude modulator signal generator means and a primary pulse amplitude modulator signal generator means. The primary PAM signal generator means includes a serial to parallel converter means where the serial signals from local data terminal equipment are converted to a plurality of parallel signals. The signals are then fed in parallel through a randomizer means to a PAM digital to analog converter means where the parallel digital signals are converted to multi-level analog signals. These multilevel analog signals are fed to signal superimposing means where the primary and secondary channel signals are combined and fed to a balanced modulator for transmission to a remote site. Each suspervisory channel signal is superimposed over a predetermined number of primary channel signals as more fully described hereinafter.

The receiver means includes signal level decision means to receive the combined PAM analog signal to determine the discrete PAM level of the incoming primary channel signals. The incoming superimposed signal and discrete PAM level are fed simultaneously to signal separator means where the magnitude of the secondary PAM analog signal is derived. The secondary channel signals are then derandomized and fed to an accumulator means which integrates the analog values of the secondary channel signal over a predetermined period corresponding to the predetermined period at the transmitting site. The integrated signal representative of the secondary channel signal is then fed simultaneously to a binary decision means and energy-threshhold detection means integrating each secondary channel signal over a predetermined period to provide a positive detection indication. The secondary channel signal is then clocked to the local receiving data terminal equipment.

In operation, the data communications system is activated by signalling the local terminal equipment that the system is ready to transmit data. After the local transmitter has completed the training cycle and the communication link is established, primary channel signals are clocked from the data terminal equipment to the serial to parallel converter means. The parallel signal outputs of converter means are randomized and fed to the PAM digital to analog converter means. The analog signals are then fed to the signal superimposing means. Simultaneously secondary channel signals are fed from the data terminal equipment, randomized and fed directly to the signal superimposing means where the analog values of the primary channel signals and secondary channel signals are summed and fed serially to the balanced modulator where the combined PAM signals are modulated with a carrier frequency for transmission over the communication medium.

The combined PAM signal is received at the remote receiving site where the receiver means demodulates the incoming signals. The signals are then fed to the signal level decision means which generates a discrete PAM signal for the primary channel signals and a digital output signal representation of the discrete PAM analog signal. This PAM level is fed to the signal separator means where the combined PAM level signal and the ideal reference PAM level are subtracted to provide an output representative of the secondary channel signal level. This signal is then derandomized and fed to the accumulator means where it is integrated to provide a secondary channel signal bit value. The integrated bit value is then fed simultaneously to binary decision means and energy threshold detector means. When the secondary signal amplitude is equal to or greater than a predetermined level binary bit decision means will generate an output signal. Similarly the energy threshold detection means will generate a positive indication signal if the value of the integrated signals exceeds a predetermined level.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
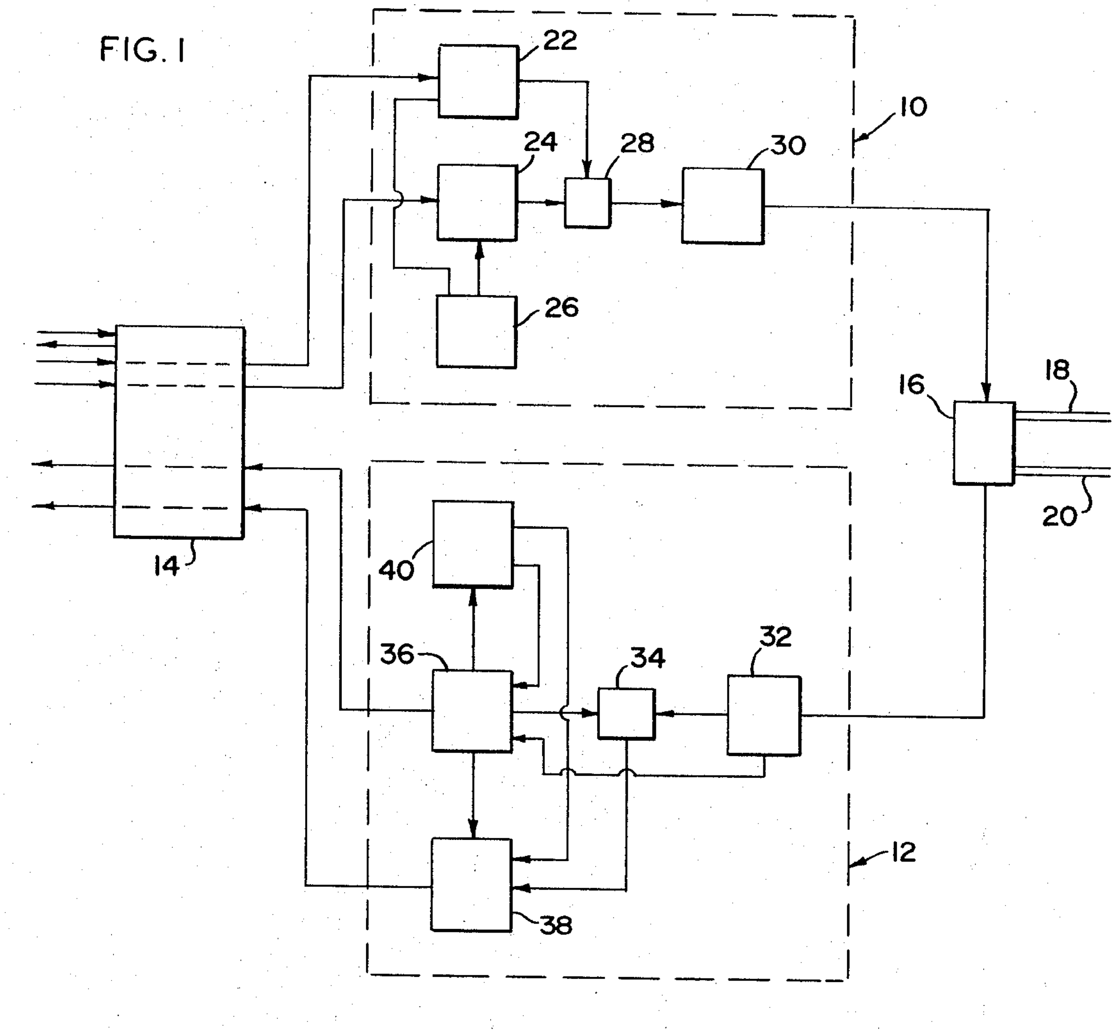
FIG. 1 is a block diagram of a data telecommunication system including an superimposed or secondary signalling device.

As shown in FIG. 1, the superimposed channel signalling device comprises transmitter means 10 and receiver means 12. As depicted, transmitter means 10 and receiver means are coupled between control/data interface means 14 and data access arragement 16. Both transmitter means 10 and receiver means 12 are coupled through data access arrangement 16, to transmission lines 18 and 20 and thence to a remote system. Although a four wire transmit/receive data access arrangement 16 is shown, a two wire system may be employed.

As shown, a transmitter means 10 comprises secondary channel PAM signal generator means 22, primary channel PAM signal generator means 24 and transmitter timing means 26, signal superimposing means 28 and signal transmitter means 30. Receiver means 12 comprises signal receiver means 32, signal separator means 34, primary channel signal level decision means 36, secondary channel decision logic means 38 and receiver timing means 40.

Figure 2:
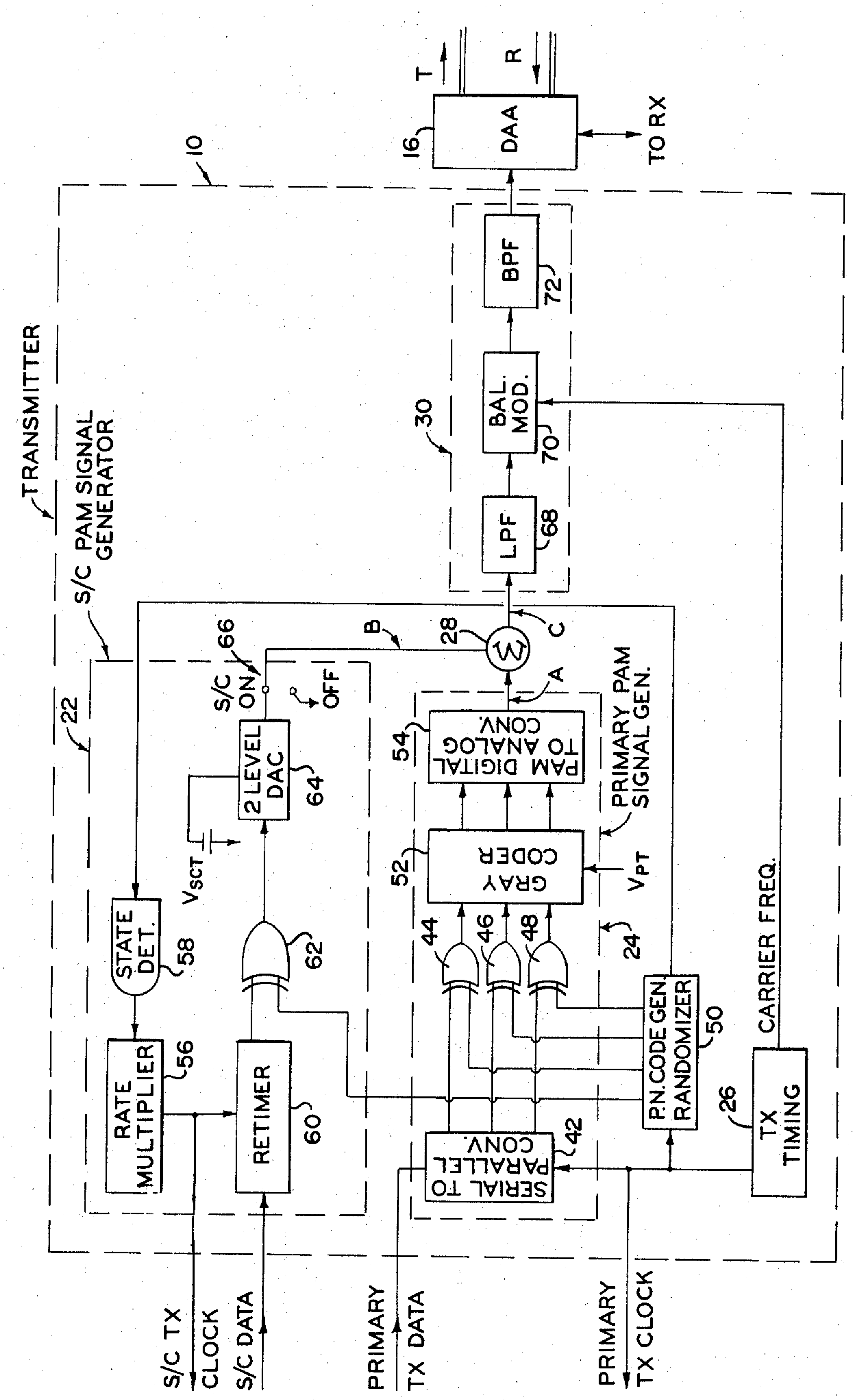
FIG. 2 is a detailed block diagram of the transmitter means.

FIG. 2 shows transmitter means 10 in detail. Primary channel PAM signal generator means 24 includes serial to parallel converter means 42 where serial data signals are converted into parallel data signals and fed to adders 44, 46 and 48 where the data signals are combined with output of randomizer means 50 which comprises a pseudo-noise code generator means. The randomized outputs of adders 44, 46 and 48 are fed to coder means 52 and thence PAM digital to analog convertor means 54 where a 2, 4 or 8 level pulse amplitude modulated analog signal is generated. In principle, any number of pulse amplitude levels may be generated, but typically 8 levels is the largest used in practical data transmission systems.

Secondary channel PAM signal generator means 22 includes rate multiplier means 56, state detector means 58, retimer means 60, adder 62, multilevel digital to analog converter means 64 and secondary channel enable switch means 66. Secondary channel signals are fed through retimer means 60 to adder 62 where it is combined with a fourth output from randomizer 50. The randomized output of adder 62 is then fed directly to multilevel digital to analog converter means 64 where the secondary channel signal is converted to a multilevel analog signal. The secondary channel analog signal is then fed to signal superimposing means 28 where the analog values of the primary and secondary channel signals are combined and fed to signal transmitter means 30 for transmission to a remote site.

Rate multiplier means 56 is synchronized by state detector means 58 to generate the secondary channel clock. State detector means 56 is coupled to code generator means 50 to provide synchronization between the primary and secondary channel signals. Timing is provided by timer means 26 and 38.

Signal transmitter means 30 comprises low pass filter 68, balanced modulator means 70 and band pass filter 72. The combined PAM analog signals are filtered and modulated with a carrier frequency for transmission.

Figure 3:
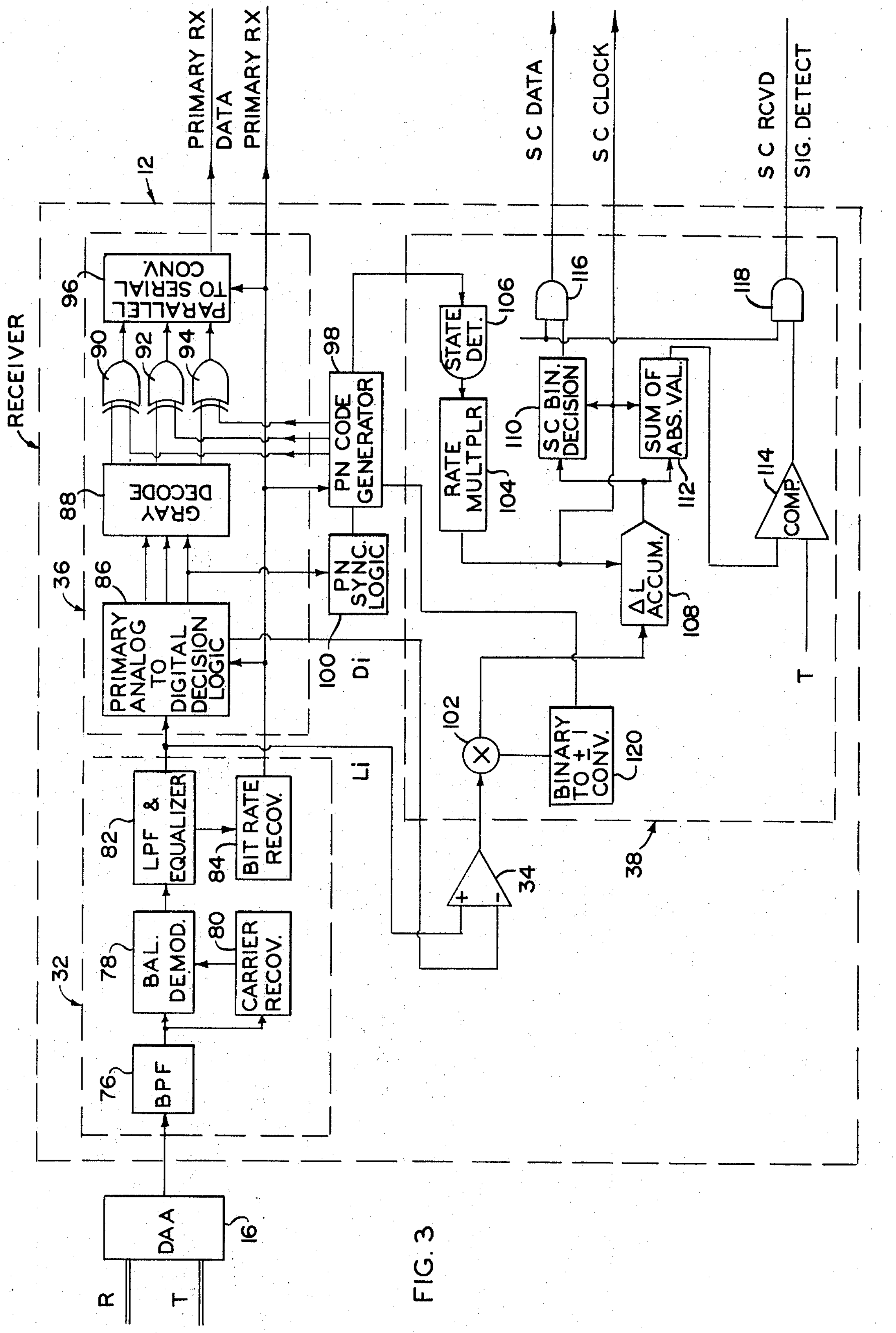
FIG. 3 is a detailed block diagram of the receiver means.

FIG. 3 shows receiver means 12 in detail. Incoming combined signals from a remote transmitting site are received through data access arrangement 16 and fed to signal receiver means 32. Signal receiver means 32 comprises band pass filter 76, balanced demodulator means 78, carrier recovery means 80, low pass filter and equalizer means 82 and bit rate recovery means 84. Signal receiver means 32 detects, demodulates and equalizes the PAM signals for amplitude distortion and phase shift experienced during transmission in order that the PAM level of the incoming signals may be properly determined. These signals (Li) which comprises the combined PAM signals are fed simultaneously to primary channel signal level decision means 36 and signal separator means 34.

Primary channel signal level decision means 36 includes primary channel signal analog to digital decision means 86, decoder means 88, adders 90, 92 and 94 and parallel to serial converter means 96. The output of primary channel signal analog to digital decision logic means comprises parallel digital signals representative of the primary channel signals which are fed to decoder means 88. A second output signal representative of the analog value of the primary channel signal is fed to signal separator means 34. Signal separator means 34 includes logic means to subtract the discrete PAM level (Di) from the combined signal vector (Li) to derive the analog value of the secondary channel signal level. Decoder means 88 decodes the primary channel signals which are in turn fed parallel to adders 90, 92 and 94 where the data bits are derandomized by signals from pseudo-noise code generator means 98. These primary channel signals are then fed to parallel to serial converter means 96 where the primary data bits are converted from parallel to serial signals and clocked to the local data terminal equipment.

The bit rate is fed from bit rate recovery means 84 to primary channel signal analog to digital decision logic means 86, code generator means 98 and the local data terminal equipment simultaneously. At the same time, an output of decision logic means 86 is fed to synchronization logic means 100. The output of synchronization logic means 100 is fed directly to PN code generator means 98 to establish synchronization of the incoming signals with code generator means 98.

Secondary channel decision logic means 38 includes adder 102, rate multiplier means 104, state detector means 106, accumulator means 108, S/C binary decision means 110, energy threshold detector means 112, comparator means 114, and gates 116 and 118, and binary connector means 124. To establish secondary rate, an enable signal is fed to state detector means 106 and then to rate multiplier means 104. A fourth derandomizing signal is fed to binary converter means 120 and adder 102 where the output of signal separator means 34 (Li-Di) or secondary channel analog signals are derandomized.

The derandomized signals from adder 102 are fed to accumulator means 108 to integrate the secondary channel signals over a predetermined period determined by the S/C rate selection and rate multiplier signal from rate multiplier means 104. This integrated signal representative of the S/C signal is fed simultaneously to S/C binary decision means 110 and energy threshold detector means 112. A high speed data mode control signal and output signal from S/C bit decision means 110 are fed to AND gate 116 which generates an S/C output signal as fully described hereinafter. Energy threshold detector means 112 generates an enable signal upon receipt and integration of M number of secondary channel signals within the predetermined limits as more fully described hereinafter. This enable signal is fed along with the high speed data mode control signal to AND gate 118 and thence to the local data terminal equipment to provide a positive S/C receive signal indication.

To operate, the data communications system is initially activated signalling by the local terminal equipment that the system is ready to transmit data. After the local transmitter has completed the training cycle and the communication link is established primary channel signals are clocked from the data terminal equipment (not shown) through interface means 14 to serial to parallel converter means 42.

Figure 4:
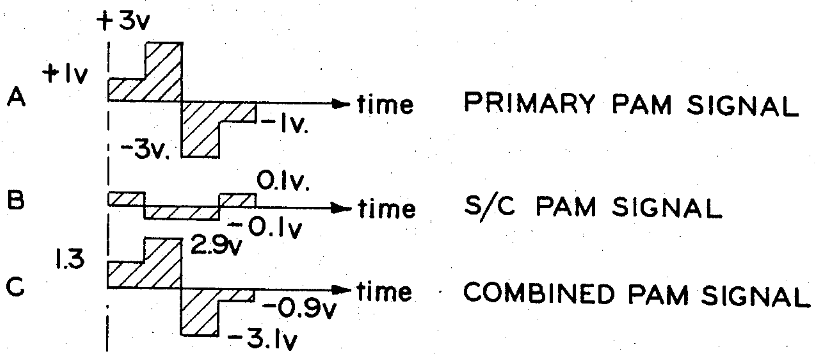
FIG. 4 is a family of signals showing the operation of the multi-level PaM and IBS level conversion means.

Upon actuation, randomizer means 50 generates an enable pulse which is fed to state detector means 58 to generate a synchronization signal to enable rate multiplier means 56 as a function of the supervisory channel rate selection fed through interface means 14. The parallel output signals of converter means 42 are randomized through adders 44, 46 and 48 and fed through coder means 52 where they are encoded and fed to PAM primary channel signal digital to analog converter means 54. The analog signals (FIG. 4*a*) are fed to signal superimposer means 28. Although a gray coder is shown any other suitable coder may be employed. Secondary channel signals are fed from the data terminal equipment through interface means 14 and retimer 60 to adder 62 as a function of the synchronized signal pulses from rate multiplier 56. The randomized secondary channel signals are fed from adder 62 to secondary channel signal digital to analog converter means 64 where they are converted to analog signals (FIG. 4*b*) and fed to signal superimposing means 28. As shown in FIG. 4*c*, these secondary channel signals are added to the analog values of the primary channel signals over the predetermined period and fed serially to signal transmitter means 30 where the combined PAM signals are filtered and modulated for transmission means over the communication medium. It should be noted that the secondary channel carrier or eneable control signal through switch means 66 is necessary to accomplish superimposing. Thus, in the absence of the enable signal, the primary channel signals operate normally.

The combined PAM signals are received at the receiving site and fed to signal receiver means 32 where the signals are filtered and demodulated. These signals are fed to signal separator means 34 and primary channel signal analog to digital decision logic means 36 which generates parallel digital output signals representative of the primary signal analog value. This is coupled to sync logic means 100 and decoder means 98. A second output of logic means 36 comprising an ideal PAM analog level representative of the primary channel signal is fed to signal separator means 34. Signal separator means 34 then subtracts the combined vector signal and ideal PAM analog level to provide an output representative of secondary channel signal. This signal is then combined with the output of binary converter 120 by adder 102 and fed to accumulator means 108 where it is integrated over a predetermined period to provide a secondary channel signal bit value. The SBS logic can automatically adjust the injected incremental signal data as a function of the primary and secondary channel signalling rate so that both the primary and secondary channel exhibit and identical probability of error in the presence of channel noise. The integrated secondary channel signal bit value is then fed simultaneously to binary decision means 110 and energy threshold detection means 112. It should be noted that the PN code generator means 98 also serves as a secondary channel bit clock. The output of logic means 86 is fed to synchronization logic means 100 which in turn is fed directly to PN code generator 98. The output of PN code generator means 98 is then fed directly to state detector means 106 where upon a predetermined signal pattern will generate an enable signal to rate multiplier means 104 where the clock signal is determined by the secondary channel rate select signal.

Energy threshold detection means 112 includes logic circuitry to sum the absolute bit value of a predetermined number of supervisory channel signals. This integrated value is then compared by comparator means 114 to the absolute sum of a previous M bit values to provide a threshold signal as a means for highly reliable received signal action control function. An M value of 2 – 4 will typically provide the desired false alarm probability versus response speed. The secondary channel binary means 110 compares the absolute value of the integrated supervisory channel signal with a predetermined value region and generates a first output signal when said absolute value is within the acceptance region and the second output signal when the integrated absolute value is not within the predetermined acceptance region.

The output of secondary channel binary decision means 110 is combined with the high speed data mode signal by AND gate 116 which when enabled by the presence of the high speed data mode signal generates a serial secondary channel signals stream which is fed through interface means 14 to the receiving data terminal equipment. Simultaneously, the output of energy threshold detection means 112 is gated with the high speed data signal by AND gate 118 and fed to interface means 14 through the data terminal equipment to provide a positive detection indication for the presence of secondary channel signals.

It should be noted with this synchronization approach that PN generators 50, 98; code synchronization system, signal receiver 32 and signal transmitter 30 may already exist in typical hi-speed PAM communication systems. Thus, the SBS approach is an inexpensive "parasite" in that both the synchronization and primary PAM systems are utilized fully with little added complexity for SBS.

Of course, synchronization may be eliminated in which case the secondary channel signals may comprise a simple state signal.

It will thus be seen that the objects set forth above, among those made apparent from the preceding description, are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,

What is claimed is:

1. A superimposed channel signalling device for transferring secondary channel signals simultaneously with primary channel signals: said signalling device comprising transmitter means including signal superimposing means coupled between data terminal equipment and signal transmitter means and receiver means including signal separator means coupled between data terminal equipment and signal receiver means, said signal superimposing means comprising logic means to superimpose said secondary channel signals on said primary channel signals to generate a summed channel signal for transmission by said signal transmitter means, said receiver means including decision logic means to determine the signal level of said primary channel signals, said signal separator means coupled to said decision logic means and said receiver means to receive said summed signal and said primary channel signal, said signal separator means comprising logic means to determine the magnitude of said superimposed secondary channel signals and secondary channel decision logic means coupled to said signal separator means, said secondary channel decision logic means including logic means to compare said secondary channel signal with a predetermined acceptance region to generate an output signal wherein said secondary channel signal is within a predetermined acceptance region.

2. The superimposed channel signalling device of claim 1 wherein each of said secondary channel signals are superimposed over a predetermined plurality of said primary channel signals, said predetermined plurality being a function of said primary and said secondary channel signal rates, said secondary channel signals being integrated over a predetermined period corresponding to said predetermined plurality of said primary channel signals.

3. The superimposed channel signalling device of claim 1 wherein said secondary channel signal comprises an asynchronous state signal independent of said primary channel signal.

4. The superimposed channel signalling device of claim 1 wherein said secondary channel signal comprises a multistate synchronous signal.

5. The superimposed channel signalling device of claim 1 wherein said secondary channel signal decision logic means further includes energy threshold detection means coupled to said signal separator means, said energy threshold detection means including logic means to integrate said secondary channel signals over a predetermined period to generate an output signal when said integrated value is within a predetermined acceptance region.

6. The superimposed channel signalling device of claim 1 wherein said transmitter means includes a primary signal generator means comprising serial to parallel converter means to transform serial primary channel data signals from the data terminal equipment into a plurality of primary channel parallel signals and a digital to analog converter means coupled to said serial parallel converter means coupled to said serial parallel converter means to receive said parallel signals, said digital analog converter means including logic means to convert said parallel primary channel signals to a multilevel primary channel signal.

7. The superimposed channel signalling device of claim 6 wherein said transmitter means further includes randomizer means coupled between said serial to parallel converter means and said digital to analog converter means to randomize said primary channel signals.

8. The superimposed channel signalling device of claim 2 wherein said transmitter means further includes synchronization means comprising state detector means coupled between said randomizer means and rate multiplier means coupled to said state detector wherein said state detector means generates an enable signal which is fed to said rate mutliplier means upon detection of a predetermined code pattern from said randomizer means.

9. The superimposed channel signalling device of claim 2 wherein said transmitter means further includes coder means coupled between said randomizer means and said signal level converter means to code said randomizer parallel signals.

10. The superimposed channel signalling device of claim 9 wherein said receiver means includes a decoder means coupled to said decision logic means to decode said primary channel signals from said decision logic means.

11. The superimposed channel signalling device of claim 10 wherein said receive means further includes a derandomizing means coupled to said decoder means to decode said derandomized primary channel signals.

12. The superimposed channel signalling device of claim 11 wherein said receive means further including a parallel to serial converter means coupled to said derandomizer means to receive said derandomized primary channel signals and convert said parallel signals to primary channel serial signal.

13. The superimposed signalling device of claim 11 wherein said secondary channel signal decision logic means comprises an integrator means coupled to said signal separator means to receive said secondary signals and to sum said secondary channel signals over a predetermined period and secondary channel binary decision means coupled to said integrator means to receive the output of said integrator means representative of said secondary channel signals to compare the value of said secondary channel signals to said predetermined acceptance region and generate an output upon receipt of said secondary channel signals within said predetermined acceptance region.

14. The superimposed channel signalling device of claim 11 wherein said energy threshold detection means includes logic means to sum the absolute value of said secondary channel signals from said accumulator means over a predetermined period and comparator means to compare the absolute sum to a predetermined value region to generate an output signal when said sum is within said predetermined acceptance region.

* * * * *

UNITED STATES PATENT OFFICE
CERTIFICATE OF CORRECTION

Patent No. 3,870,828 Dated March 11, 1975

Inventor(s) Thomas V. Saliga

It is certified that error appears in the above-identified patent and that said Letters Patent are hereby corrected as shown below:

Column 3, line 42, delete "PaM" and insert therefor --PAM--.
Column 6, line 66, after "binary" insert --decision--.
Column 8, line 46, delete "2" and insert therefor --7--.
Column 8, line 56, delete "2" and insert therefor --7--.

Signed and sealed this 27th day of May 1975.

(SEAL)
Attest:

RUTH C. MASON
Attesting Officer

C. MARSHALL DANN
Commissioner of Patents
and Trademarks

ORM PO-1050 (10-69)

USCOMM-DC 60376-P69
U.S. GOVERNMENT PRINTING OFFICE : 869-930